Aug. 20, 1940.   J. M. BITTNER   2,212,147
PLOW POINT
Filed Nov. 4, 1938
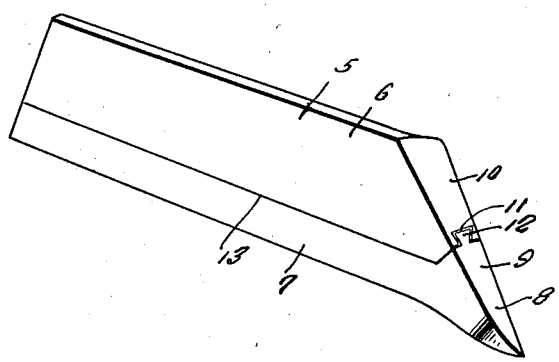
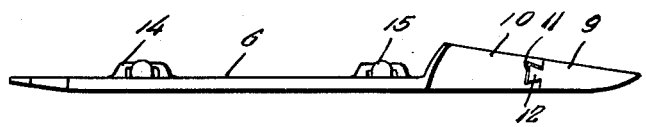
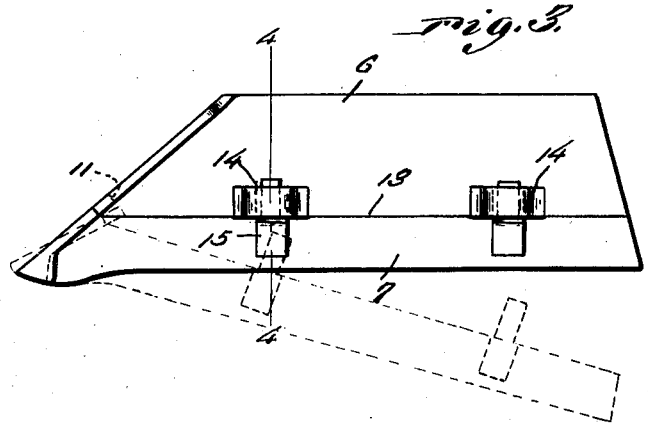
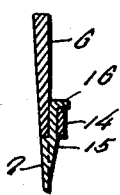
Inventor
J. M. Bittner
By Clarence A. O'Brien
and Hyman Berman
Attorneys

UNITED STATES PATENT OFFICE 2,212,147

PLOW POINT

John M. Bittner, Barnes City, Iowa, assignor of one-third to H. S. Ingraham, Barnes City, Iowa, and one-third to Harold E. Bryan, Montezuma, Iowa Application November 4, 1938, Serial No. 238,874

3 Claims. (Cl. 97—125)

The present invention relates to plows and has for its primary object to provide means for removably attaching the cutting edge of the plow to the share in order that the plow point may be renewed or replaced without requiring an entirely new plow share.

A further object of the invention is to provide an interfitting engagement for the plow point with the plow share at the front end thereof and further to provide interengaging devices adapted to secure and maintain the side edges of the plow point and plow share in assembled position.

A still further object is to provide a device of this character of simple and practical construction, which is strong and durable, relatively inexpensive to manufacture and otherwise adapted for the purposes for which the same is intended.

Other objects and advantages reside in the details of construction as more fully hereinafter described and claimed, reference being had to the accompanying drawing forming part hereof, wherein like numerals refer to like parts throughout, and in which—

Figure 1 is a perspective view.

Figure 2 is a top plan view.

Figure 3 is a side elevational view, and

Figure 4 is a vertical sectional view taken substantially on a line 4—4 of Figure 3.

Referring now to the drawing in detail, the numeral 5 designates the plow share generally, including an upper section 6 and lower section 7, the latter terminating at its front end in the plow point 8. The plow point 8 is formed with a relatively broad upwardly and rearwardly inclined face as shown at 9, and which merges with the correspondingly inclined front edge 10 of the upper section 6.

At the meeting edges of the front faces 9 and 10, the upper and lower portions of the plow are provided with a dovetail interfitting engagement which includes a notch 11 formed in the front face 10 of the upper section 6 and a tongue 12 projecting upwardly from the upper edge of the front face 9 of the point 8.

Also as clearly illustrated in Figure 1 of the drawing, the meeting edges of the front faces 9 and 10 are connected at a point above the meeting edges 13 of the side portion of the upper and lower sections of the plow. This construction forms a substantially enlarged head at the point of the plow.

As more clearly illustrated in Figure 2 of the drawing, the front faces 9 and 10 are off-set toward one side of the plow and converge toward the point 8.

To the side of the upper section 6, immediately behind the offset faces 9 and 10, and adjacent the meeting edge 13, are a plurality of horizontal loops 14, each loop accommodating an upstanding lug 15 rising from the side of the lower section 7 and projecting above its upper edge 13, the upper ends of the lugs being upset to form an outstanding flange 16 adapted to rest upon the upper edge of the loop 14. The lugs 15 thus secure the upper and lower sections as a unit against transverse as well as against vertical separation, which is likewise true of the dovetail interfitting engagement at the front ends of the sections.

In assembling the parts of the device, the lower section 7 is held in an inclined position as shown by the dotted lines in Figure 3 and the dovetailed tongue 12 is fitted in the notch 11, after which the lower section 7 is swung upwardly into the full line position so that the lugs 15 will enter the loops 14, the upper ends being upset to secure the parts against accidental separation. In order to assemble the parts the dovetail tongue and notch as well as the lugs and loops are suitably constructed with sufficient freedom to enable the swinging engaging movement of the lower section 7 after the dovetail has been matched.

It will be apparent from the foregoing that when the plow point 8 becomes dulled that the same may be replaced by removing the lugs 15 and substituting a new bottom section 7 and plow point 8.

It is believed the details of construction and manner of assembly of the device will be readily understood from the foregoing without further detailed explanation.

Having thus described the invention, what I claim is:

1. A plow share comprising upper and lower flat sections, said lower section having a forwardly projecting plow point, an interfitting connection at the front end of the sections operable by reason of an interfitting engagement to prevent lateral as well as vertical separating movement of the sections and interengaging means connecting the sections in superimposed edgewise position.

2. A plow share comprising upper and lower flat sections, said lower section having a forwardly projecting plow point, an interfitting connection at the front end of the sections operable by reason of an interfitting engagement to prevent lateral as well as vertical separating movement of the sections, loops carried by the upper section and lugs carried by the lower section and inserted in said loops said lugs bridging the meeting edges of the sections and having their upper edges upset upon the loop to secure the same together.

3. A plow share comprising upper and lower flat sections arranged in superposed edgewise relation, said sections having relatively broad front faces inclined upwardly and rearwardly in a common plane, the lower section at its front end defining a plow point, a notch in the meeting edge of the face of one section and a tongue in the meeting edge of the face of the other section seated in said notch to secure the sections against lateral as well as against vertical separating movements, upstanding lugs rising above the upper edge of the lower section and loops on one side of the upper section for receiving said lugs.

JOHN M. BITTNER.